United States Patent
Sehr

(10) Patent No.: US 6,726,978 B2
(45) Date of Patent: Apr. 27, 2004

(54) ASYMMETRICAL SUPPORT STRIP CHASSIS SEALANTS

(75) Inventor: Ralf Sehr, Loshelm (DE)

(73) Assignee: Saar Gummi GmbH, Wadern-Büschfeld (DE)

( * ) Notice: Subject to any disclaimer, the term of this patent is extended or adjusted under 35 U.S.C. 154(b) by 39 days.

(21) Appl. No.: 10/204,694
(22) PCT Filed: Dec. 12, 2001
(86) PCT No.: PCT/DE01/04685
§ 371 (c)(1), (2), (4) Date: Aug. 23, 2002
(87) PCT Pub. No.: WO02/057104
PCT Pub. Date: Jul. 25, 2002

(65) Prior Publication Data
US 2003/0108713 A1 Jun. 12, 2003

(30) Foreign Application Priority Data
Jan. 17, 2001 (DE) .......................................... 101 01 778

(51) Int. Cl.⁷ ................................................ B32B 3/24
(52) U.S. Cl. ...................... 428/134; 428/122; 428/358; 428/83; 428/131; 428/136; 428/135; 428/596; 52/716.5; 52/716.6; 52/716.7; 52/716.2; 52/716.1; 52/716.8; 52/717.01; 49/490.1; 296/93; 277/647; 277/641
(58) Field of Search ............................... 428/122, 358, 428/83, 131, 134, 136, 135, 596; 49/490.1; 296/93; 277/647, 641; 52/716.5, 716.6, 716.7, 716.2, 716.1, 716.8, 717.01

(56) References Cited

U.S. PATENT DOCUMENTS

| | | | | |
|---|---|---|---|---|
| 2,242,438 A | * | 5/1941 | Rydquist | 428/88 |
| 3,256,577 A | * | 6/1966 | Bright | 24/563 |
| 3,706,628 A | * | 12/1972 | Azzola | 428/122 |
| 4,304,816 A | * | 12/1981 | Bright et al. | 428/358 |
| 4,749,203 A | * | 6/1988 | Bright | 277/642 |
| 5,249,353 A | | 10/1993 | Kranz | 29/446 |
| 5,302,466 A | * | 4/1994 | Davis et al. | 428/573 |
| 5,651,218 A | * | 7/1997 | Bright et al. | 49/490.1 |
| 5,783,312 A | * | 7/1998 | Laughman et al. | 428/573 |
| 5,871,682 A | * | 2/1999 | Kii et al. | 264/285 |
| 6,306,522 B1 | * | 10/2001 | Strutz et al. | 428/595 |
| 2002/0068146 A1 | * | 6/2002 | Steinl | 428/131 |
| 2003/0108713 A1 | * | 6/2003 | Sehr | 428/131 |

FOREIGN PATENT DOCUMENTS

| | | |
|---|---|---|
| EP | 707 995 | 4/1996 |
| EP | 1 138 537 | 10/2001 |
| WO | WO 00/29237 | 5/2000 |

* cited by examiner

Primary Examiner—William P. Watkins, III
(74) Attorney, Agent, or Firm—James Creighton Wray; Meera P. Narasimhan

(57) ABSTRACT

The aim of the invention is the development of a support strip, which lends a seal, made from a rubber material, a stiffness adequate for production and assembly, has good extension and compression properties, has an adequate mobility in order to be able to follow the given directional curves of the chassis components and lends the seal a clamping force sufficient for a secure and durable seating of the seal on the attachment flange of the chassis components. Said aim must be achieved with the proviso of a lowest possible weight and low production costs for said support strip. The aim is achieved by means of an asymmetric arrangement of short (2) and long (3) wedge-like recesses and slots (4) in the support strip as in FIG. 1, permitting a low weight and low production costs in fulfilling the said aims. The invention further relates to an asymmetric strip which can be used as reinforcing support for a seal made from rubber material in chassis production of automobiles.

2 Claims, 2 Drawing Sheets

US 6,726,978 B2

ASYMMETRICAL SUPPORT STRIP CHASSIS SEALANTS

This application claims the benefit of German Application No. 101 01 778.2 filed Jan. 17, 2001 and PCT/DE01/04685 filed Dec. 12, 2001.

BACKGROUND OF THE INVENTION

The present invention concerns an asymmetrical, metal strip which is used to hold a gasket made of rubber-like material for auto bodies. When the metal-backed gaskets are installed, they are fastened to the relevant flanges on the car body, here in particular to the trunk lid and the doors.

The metal mounting strip ensures a sufficient adhesion to the arbor-mounted flange, and thus a secure and enduring seat for the gasket, which could not be achieved with a gasket of rubber-like material alone.

A mounting strip is manufactured by stamping out notches and slots from a metal strip as an intermediate product, bent into a U-shaped cross section and subsequently sprayed with a rubber-like, pliable gasket material.

The basic demands on such a mounting strip when used as a component of a gasket in the automobile body region are to be seen in the following points:

Good performance under tension and compression,

High tensile strength,

High mobility in all directions,

High adhesive strength,

Low weight as well as

Low manufacturing costs.

Good performance under tension and compression is especially required when the gasket is ready to be installed in the car; in particular, if the gasket can stretch or be compressed without forming creases, and if the assembler can compensate for slight discrepancies in length which occur during the manufacture of the gasket strip. This will relax the demand for the high tolerances in the manufacturing process, which reduces the costs of the process.

The demand for the highest tensile strength possible, is based upon the fact that the gasket strand is exposed to a tensile stress during manufacture, and should not tear in the process.

A gasket should be flexible in all directions, so that during assembly, the assembler can follow the specified procedure for arbor-mounting to the automobile body.

A high adhesive strength between gasket and the arbor-mounted flange on the body brings about a secure and durable fit of the gasket on the arbor-mounted flanges on that part of the body.

In order to save on production costs and fuel costs for operating the automobile, the weight of the gasket should be kept as low as possible. For this reason, aluminum is frequently used as a support material, which nonetheless has negative effects on the physical properties of the mounting strip, and therefore the thickness of the material must often be increased.

Moreover, the configuration of the mounting strip should enable the most economical manufacture possible.

DE 19725166 A1 contains information about a metal strip, which besides lengthwise notches, also has corrugation-like stamped creases. Thanks to the notches, the strip can be stretched and compressed. The stampings ensure a high adhesive strength of the gasket to the relevant body parts, and therefore allow for a reduction in the thickness and weight of the material. In the subsequent processing of the strip, the disadvantages of the stampings nonetheless become apparent, in that a special bending tool is required for bending the strip into the U-shaped cross section, so that the shape of the stamping at least not totally lost in the process. Furthermore, the stamping process requires additional tools. The finished strips are wound into spools for subsequent processing or for transport; but the stamping process leads to a greater effective strip thickness and hence a greater volume of the spool. In addition, problems arise when the metal strip is sprayed with the rubber-like gasket material.

DE 69501998 T2 and DE 3628448 C2 describe metallic strips which are manufactured according to the roll cutting process. Here the notches are not stamped out, but are cut using a tool in the shape of a thin line.

The notches notch get their characteristic shape through a subsequent stretching. With this manufacturing method, however, it is possible to create only symmetrical notches. The form that the notches take is thus quite inflexible, and is not easily brought to the desired thickness criterion. Consequently, when strips are manufactured according to the roll cutting process, owing to the consequent notch effect, a greater material thickness is required in order to achieve the same strength as those of a strip which was produced using the stamping process.

Furthermore, DE 3628448 C2 contains information on a strip whose bending behavior is said to be improved by an asymmetrical arrangement of the notches. This is attained by making short notches inside the bend, and long ones on the outside. This nonetheless leads to problems if a gasket strand is supposed to follow various different directions along a body part.

SUMMARY OF THE INVENTION

With this as a starting point, the objective underlying the invention, is to develop a metal mounting strip, which imparts a sufficient strength to the gasket of a rubber-like material for manufacture and installation, behaves well under tension and compression, possesses sufficient mobility to follow prescribed changes in direction of various body parts, and gives the gasket an adhesive strength, which would ensure a secure and enduring seating of the gasket on the arbor-mounted flange of the relevant body part. The mounting strip must fulfill these objectives in the context of the least possible weight as well as low manufacturing costs.

The objective is accomplished through a selection of the arrangement and shape of notches and slots in the mounting strip in accordance with the Characterizing Section of claim 1 and FIG. 1, which in meeting the demands for sufficient strength, mobility, good stretching and compressive behavior and high adhesive strength, permits a the metal base material to be only about 0.5 mm thick, with a correspondingly lowest possible weight, as well as low manufacturing costs with a simple manufacturing method, namely stamping.

A prototype of the invention is given FIGS. 1 and 2, and is described below with reference to the Figures.

BRIEF DESCRIPTION OF THE DRAWINGS

FIG. 1 depicts a mounting strip before the bending process. Short and long wedge-shaped notches 2 and 3 as well as slots 4 are stamped in the metal base element 1. In any given case, a short and a long, wedge-shaped notch lie opposite each other, whereby the tips 2.1 and 3.1 point toward each other and toward the center line 5 of the mounting strips, and the short sides 2.2 and 3.2 of the wedge-shaped notches are directed toward the respective edge 8 of the mounting strip. The tip of the long, wedge-shaped notch projects over the center line of the mounting strip. The center lines of the two opposed short and long, wedge-shaped notches are coincident. In relation to the longitudinal axis of the mounting strip, a short and a long wedge-shaped notch alternate at all times, separated in any given case by a slot. The center lines of two opposed slots are coincident. The tips 4.1 of opposed slots point toward one another and possess the same distance to the center line of the strip. Conditioned by the described shape of the wedge-shaped notches and slots, bars 6.1 and 6.2 remain opposite to one another, between the tips of the short and long wedge-shaped notches lying opposite one another as well as between the tips of slots in the metal lying opposite one another. If one connects the midpoints of these bars, there results a zigzag like line 7 over the long axis of the mounting strip.

FIG. 2 shows the cited mounting strip after the bending process, in the course of which a U-shaped cross section was created.

DETAILED DESCRIPTION OF THE PREFERRED EMBODIMENTS

Figure 1:
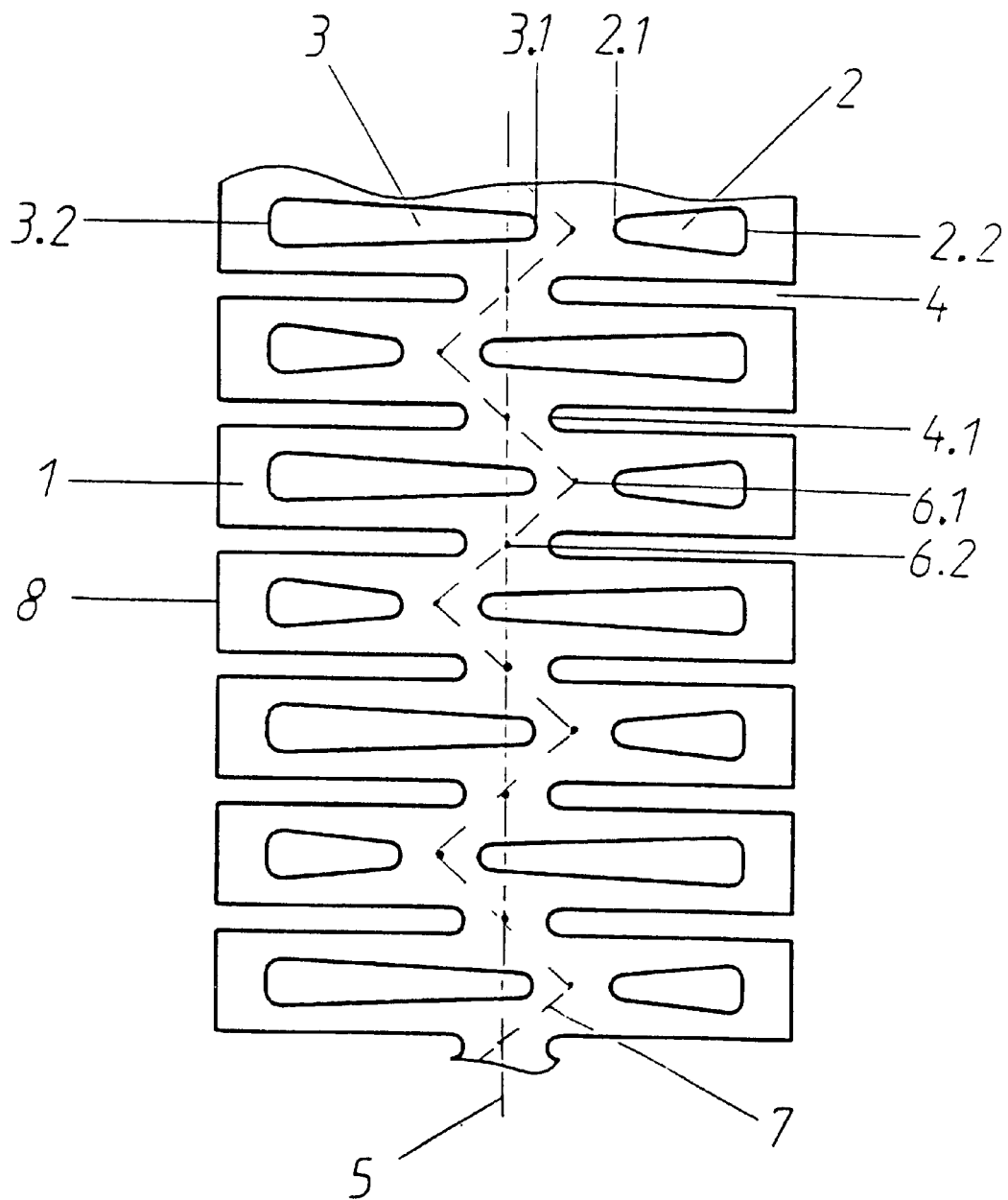
FIG. 1 shows a mounting strip before the bending process.
Figure 2:
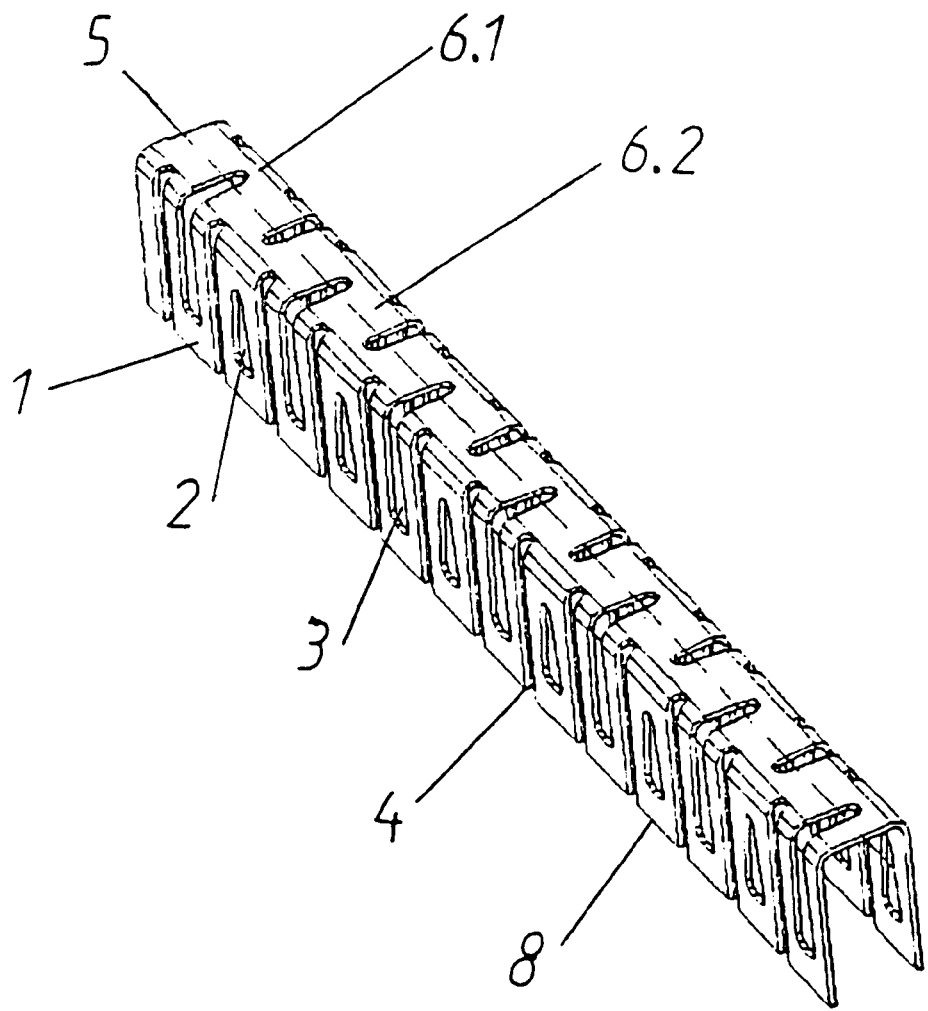
FIG. 2 shows the cited mounting strip after the bending process.

Thanks to the wedge-shaped form of the notches, and by their asymmetrical arrangement of the short and long, wedge-shaped notches, a great capacity for stretching and compression, in combination with a great strength and adhesive force of the gasket is attained. In the process, what is attained in the region of the long, wedge-shaped Notch 3, is a great stretching and compressive capacity as well as a mobility of the mounting strip in all directions, while the short, wedge-shaped notch 2 brings about that the metallic bar between tips 2.1 and 3.1 of the opposed short and long, wedge-shaped notches, has a sufficient width to achieve great stability and strong adhesion of the gasket. High mobility of mounting strip is also attained in that the tip 3.1 of the long wedge-shaped notch reaches over the center line of mounting strip 5.

In this way, that the connection of the midpoints of bars 6.1 and 6.2 forms a zigzag-shaped line, and the stretching and compressive behavior of the mounting strip and its flexibility are additionally increased, and the formation of creases upon compression is counteracted since a continuous, straight metallic bar is avoided.

In this connection, a length ratio of short to long wedge-shaped notches of about 1 to 2 has proven to be especially advantageous.

REFERENCE NUMBER LIST

1 Metal base element
2 Short, wedge-shaped notch
2.1 Tip of the short, wedge-shaped notch
2.2 Short side of the short, wedge-shaped notch
3 Long, wedge-shaped notch
3.1 Tip of the long, wedge-shaped notch
3.2 Short side of the long, wedge-shaped notch
4 Slot
4.1 Tip of the slot
5 Center line of the mounting strip
6.1 Metallic bar between 2.1 and 3.1
6.2 Metallic bar between the tips of two opposed slots
7 Connection line of the midpoints of the metallic bars 6.1 and 6.2
8 Edge of the mounting strip.

What is claimed is:

1. Mounting strip for automobile body gaskets with asymmetrically arranged notches and symmetrically arranged slots, wherein the notches are constructed wedge-shaped, in that in each case a short and a long wedge-shaped notch whose center lines are coincident lie opposite each other, the tips of which point toward each other and toward the center line of the mounting strip and the short sides of which are directed toward the respective edge of the mounting strip, in that the long, wedge-shaped notch projects over the center line of the mounting strip, in that in relation to the long axis of the mounting strip in any given case a short and a long wedge-shaped notch alternate, at all times separated by a slot, in that the connection of the midpoints of the bars forms a zigzag-shaped line between the short and long, wedge-shaped notches and between the tips of the slots.

2. The mounting strip of claim 1 for automobile body gaskets with asymmetrically arranged notches and symmetrically arranged slots, wherein the length ratio of the short to the long wedge-shaped notch comes to about 1 to 2.

\* \* \* \* \*